(12) United States Patent
Radke et al.

(10) Patent No.: US 8,095,835 B2
(45) Date of Patent: *Jan. 10, 2012

(54) ERROR SCANNING IN FLASH MEMORY

(75) Inventors: William Henry Radke, Los Gatos, CA (US); Peter Sean Feeley, Boise, ID (US); Siamack Nemazie, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/846,629

(22) Filed: Jul. 29, 2010

(65) Prior Publication Data

US 2010/0313077 A1    Dec. 9, 2010

Related U.S. Application Data

(63) Continuation of application No. 11/843,466, filed on Aug. 22, 2007, now Pat. No. 7,770,079.

(51) Int. Cl.
*G11C 29/00* (2006.01)
(52) U.S. Cl. ........................................ 714/718; 714/763
(58) Field of Classification Search .................. 714/718, 714/763
See application file for complete search history.

(56) References Cited

U.S. PATENT DOCUMENTS

| 5,515,333 | A  | * | 5/1996  | Fujita et al. ................. 365/229 |
| 5,604,756 | A  | * | 2/1997  | Kawata ........................ 714/773 |
| 6,046,937 | A  |   | 4/2000  | Komori et al. |
| 6,336,203 | B1 |   | 1/2002  | Yoshida |
| 6,421,279 | B1 | * | 7/2002  | Tobita et al. ........... 365/189.011 |
| 6,651,212 | B1 | * | 11/2003 | Katayama et al. ............ 714/763 |
| 6,993,690 | B1 |   | 1/2006  | Okamoto |
| 7,137,027 | B2 | * | 11/2006 | Shiota et al. ...................... 714/5 |
| 7,173,852 | B2 | * | 2/2007  | Gorobets et al. ......... 365/185.09 |
| 7,356,442 | B1 |   | 4/2008  | Astigarraga et al. |
| 7,447,936 | B2 |   | 11/2008 | Shiota et al. |
| 7,496,810 | B2 |   | 2/2009  | Hara |
| 7,770,079 | B2 |   | 8/2010  | Radke et al. |
| 2006/0039196 | A1 |   | 2/2006  | Gorobets et al. |
| 2007/0168603 | A1 |   | 7/2007  | Takai et al. |
| 2007/0283224 | A1 | * | 12/2007 | Kirschner et al. ............ 714/768 |
| 2009/0055697 | A1 |   | 2/2009  | Radke et al. |

FOREIGN PATENT DOCUMENTS

WO    WO-2009025857 A1    2/2009

* cited by examiner

*Primary Examiner* — James C Kerveros
(74) *Attorney, Agent, or Firm* — Schwegman, Lundberg & Woessner, P.A.

(57) ABSTRACT

Various embodiments include methods, apparatus, and systems to scan at least a portion of a memory device for potential errors when a condition for scanning is met. The condition may be dependent on one or more of a number of read operations, a number of write operations, time, and others. Other embodiments including additional methods, apparatus, and systems are disclosed.

15 Claims, 5 Drawing Sheets

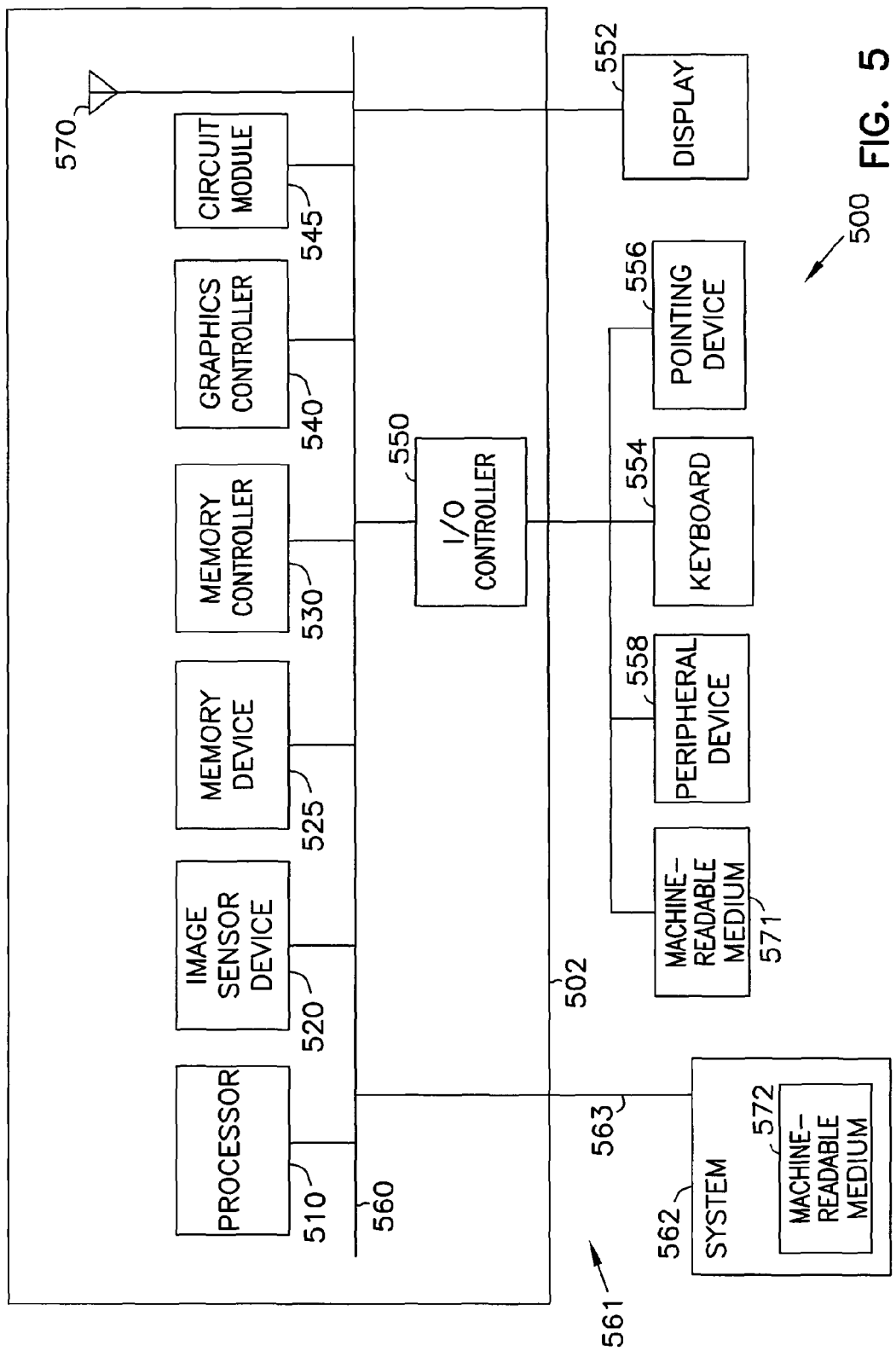

ERROR SCANNING IN FLASH MEMORY

CLAIM OF PRIORITY

This application is a continuation of and claims the benefit of priority under 35 U.S.C. §120 to U.S. patent application Ser. No. 11/843,466 filed on Aug. 22, 2007, now issued as U.S. Pat. No. 7,770,079, which is hereby incorporated by reference herein in its entirety.

FIELD

Embodiments of this disclosure relate to non-volatile memory devices, including managing information in flash memory devices.

BACKGROUND

Non-volatile memory devices such as flash memory devices are used to store data or information. Flash memory devices reside in many computers and electronic devices, for example, cellular phones, digital cameras, digital audio players, and digital recorders. Flash memory devices may also be used as portable storage devices such as portable Universal Serial Bus (USB) flash drives or "thumb" drives. In some cases, flash memory devices may substitute for conventional magnetic hard drives in computers and other electronic devices or systems.

A flash memory device stores information in numerous memory cells, which are usually formed in a semiconductor chip. A flash memory device usually has a programming or write operation to store information in the cell, a read operation to read information from the cells, and an erase operation to erase or delete information from the cells.

In some cases, potential errors may occur in the information stored in the flash memory device. If the potential errors are left undetected, the information may become unusable. Therefore, there is a need for methods, apparatus, and systems to detect potential errors in information in flash memory devices.

BRIEF DESCRIPTION OF DRAWINGS

FIG. 5 shows a block diagram of a network system according an embodiment of the invention.

DETAILED DESCRIPTION

Figure 1:
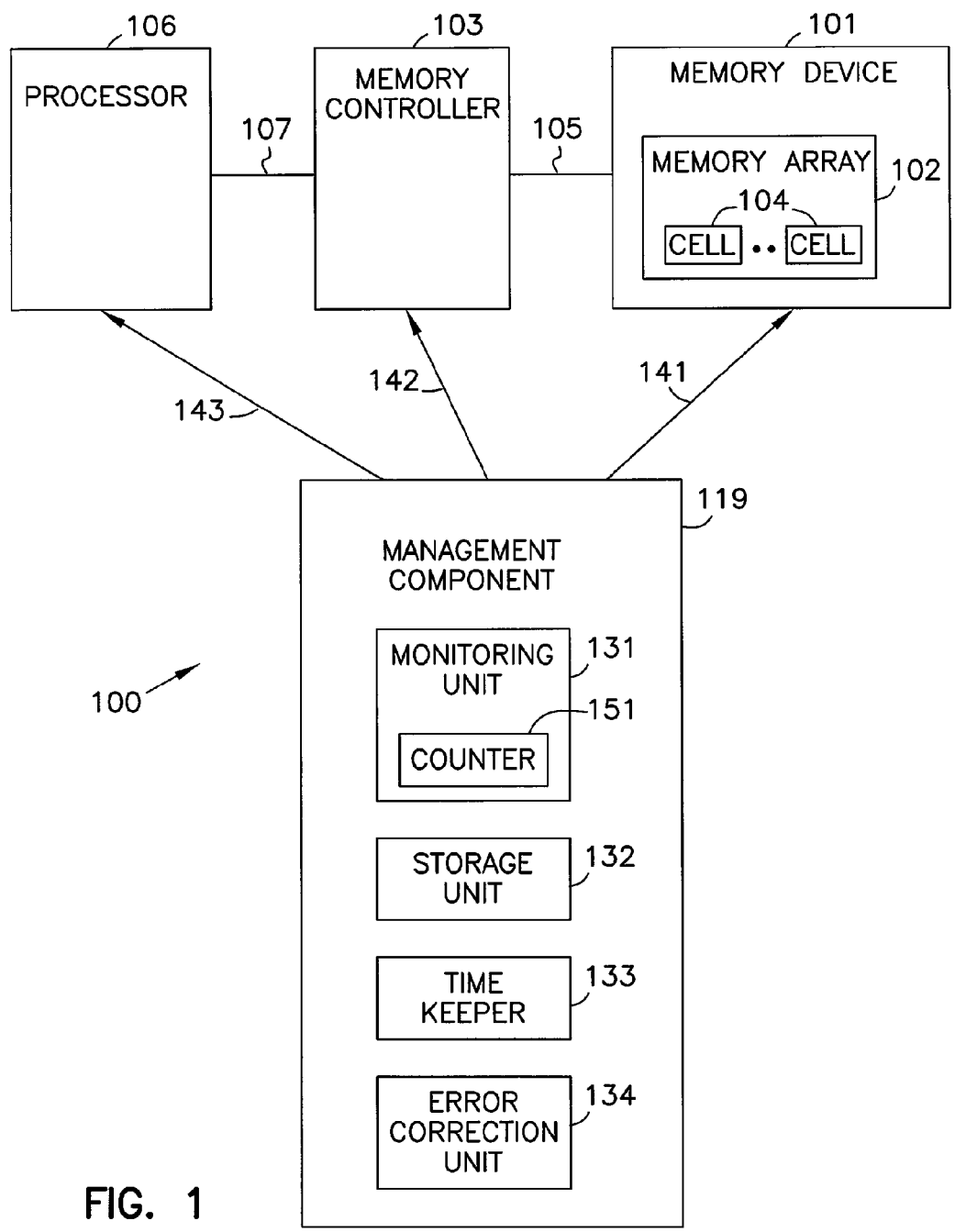
FIG. 1 shows a block diagram of a system including a memory device according to an embodiment of the invention.

FIG. 1 shows a block diagram of a system 100 according an embodiment of the invention. System 100 may reside in an electronic system such as a computer, a cellular phone, or a digital camera. As shown in FIG. 1, system 100 may include a memory device 101 having a memory array 102 with memory cells 104 to store information. The information may include at least one of data from a user and control data generated by system 100. System 100 may also include a memory controller 103 to control communication between memory device 101 and a processor 106 via one or more interfaces or bus 105 and bus 107.

System 100 may further include a management component 119, which may participate in scanning memory device 101 for potential errors in information stored in memory device 101 and correcting the errors. As described above, undetected potential errors may become unusable. In system 100, scanning memory device 101 for potential errors before the information becomes unusable and then correcting the errors may reduce an overall error rate, or avoid unusable information, or both.

Management component 119 may include monitoring unit 131 to track a number of accesses to and from memory array by monitoring signals on bus 105, 107, or both. For example, monitoring unit 131 may include at least one counter 151 to count numbers of read operations or write operations in memory device 101. Management component 119 may also include a storage unit 132 to store one or more values that may be used in error scanning activities of system 100. Storage unit 132 may include storage circuit elements such as read only memory (ROM) storage element, electrical erasable programmable ROM (EEPROM), and register circuitry. Management component 119 may also include a time keeper 133, which may include a real-time clock to keep track of time. Management component 119 may also include an error correction unit 134 to correct errors that may be found in information stored in memory device 101. Error correction unit 134 may include an error correction circuitry to correct errors based on error correction code (ECC) data associated with the stored information. The ECC data may be generated based on codes such as Hamming code, Reed-Solomon code, and BCH code (Bose, Ray-Chaudhuri, Hocquenghem code).

In FIG. 1, arrows 141, 142, and 143 indicate that either the entire management component 119 may reside in only one of memory device 101, memory controller 103, and processor 106, or portions of management component 119 may be scattered among at least two of memory device 101, memory controller 103, and processor 106. Management component 119 may include software program instructions, firmware, hardware, or a combination thereof. An example of firmware in management component 119 includes basic input output system (BIOS) circuitry or circuitry similar to BIOS circuitry of an electronic system. An example of hardware in management component 119 includes circuit elements such as flip-flop circuitry, register circuitry, state machine circuitry, and other circuit elements.

Memory device 101 of FIG. 1 may include a non-volatile memory device such as a flash memory device. Processor 106 may include a general-purpose processor (e.g., a processor used in a computer) or an application specific integrated circuit or ASIC (e.g., a processor used in a cellular phone or a digital camera). Memory device 101 and memory controller 103 may be formed from the same semiconductor die and enclosed in the same semiconductor package or chip. Memory device 101 and memory controller 103 may also be formed from separate semiconductor dice and enclosed in separate semiconductor packages or separate chips. In some embodiments, memory controller 103 may be omitted, and memory device 101 and processor 106 may communicate with each other via one or both of buses 105 and 107. In some embodiments, memory device 101 may include a memory device of FIG. 2.

Figure 2:
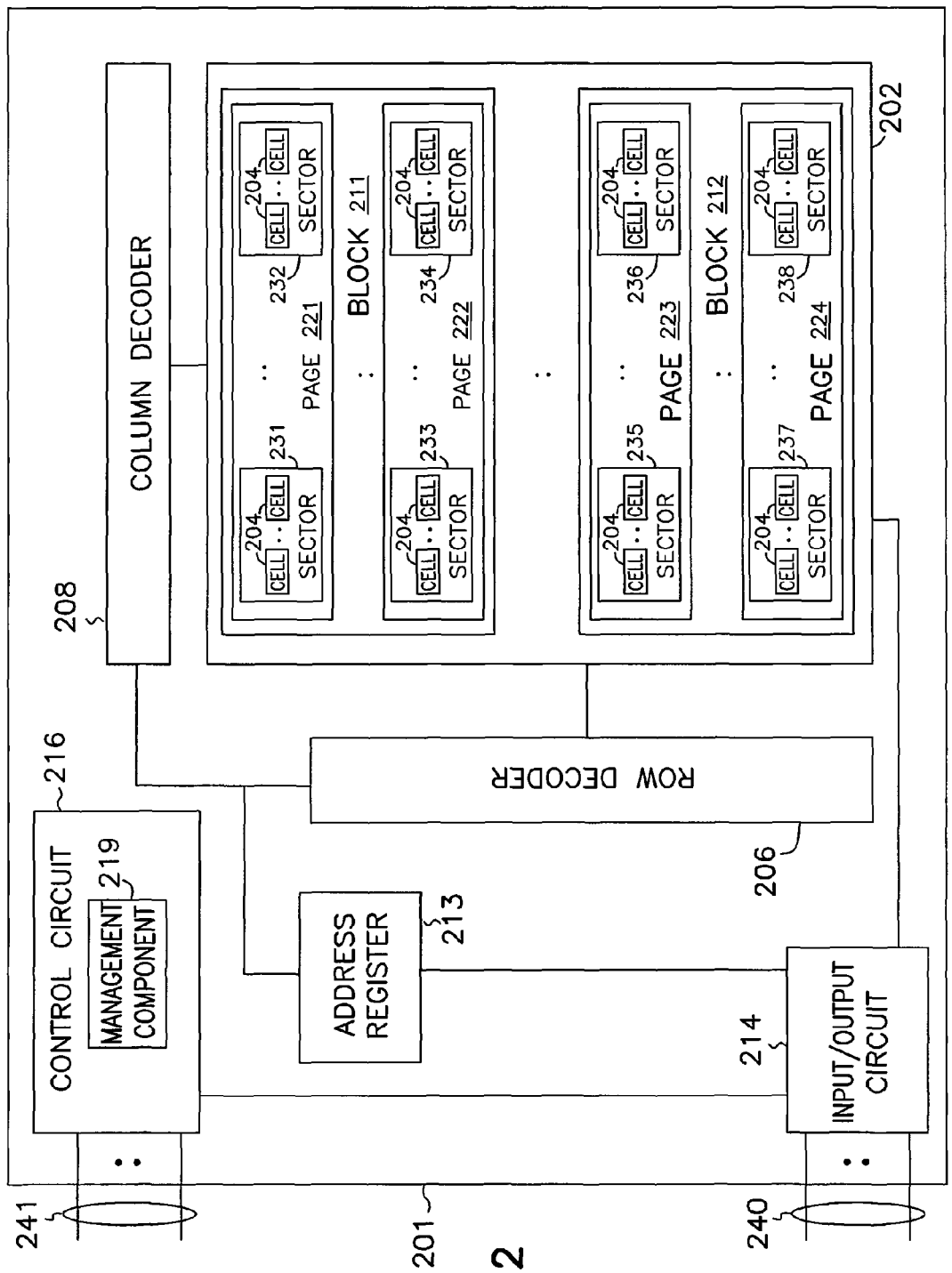
FIG. 2 shows a block diagram of a memory device according to an embodiment of the invention.

FIG. 2 shows a block diagram of a memory device 201 according to an embodiment of the invention. Memory device 201 may include a memory array 202 with cells 204 arranged in rows and columns. Row decoder 206 and column decoder 208 may respond to an address register 213 and access cells 204 based on row address and column address signals on lines or terminals 240. Accessing cells 204 may include writing information to cells 204 or reading information from cells 204. A data input/output circuit 214 may transfer information between cells 204 and terminals 240. Terminals 240 and terminals 241 of memory device 201 may be coupled to an interface or a bus such as bus 105 and 107 of FIG. 1. Terminals 240 and 241 may include external terminals of memory device 101 (e.g., terminals located outside a chip or semiconductor package that contain memory device 101). A read operation may be performed based on read command (or signals indicating a read operation) provided on terminal 241. A write operation may be performed based on write command (or signals indicating a write operation) provided on terminals 241. By monitoring activity, such as transferring of signals, on terminals 240 and 241, memory device 201 may track or determine a number of read and write operations performed on the entire memory array 202 or in an individual block.

A control circuit 216 may control operations of memory device 201 based on signals on terminals 240 and 241. The operations of memory device 201 may include a write operation to write or program information into cells 204, a read operation to read information from cells 204, and an erase operation to erase information from cells 204. The write, read, and erase operations of memory device 201 may be performed in connection with various activities in memory device 201, such as scanning for errors in information stored in cells 204.

Control circuit 216 may include a management component 219, which may include an embodiment of management component 119 of FIG. 1. In some embodiments, management component 219 of FIG. 2 may include fewer circuit elements than management component 119 of FIG. 1. For example, management component 219 of FIG. 2 may omit an error correction unit such as error correction unit 134 of FIG. 1. In FIG. 2, management component 219 of memory device 201 may participate in scanning cells 204 in memory array 202 for potential errors. Management component 219 may also participate in correcting the errors.

Memory array 202 may include memory blocks 211 and 212, pages (or rows of cells) 221, 222, 223, and 224, and sectors 231, 232, 233, 234, 235, 236, 237, and 238. As shown in FIG. 2, each of blocks 211 and 212 may include multiple pages, each page may include multiple sectors, and each sector may include multiple cells. Blocks 211 and 212 may be called erased blocks of a flash memory device. For clarity, FIG. 2 shows an example of two blocks in memory array 202, two pages in each block, two sectors in each page, and two cells in each sector. In some embodiments, the number of two blocks in memory array 202, the number of pages in each block, the number of sectors in each page, and the number of cells in each sector may vary. For example, each of blocks 211 and 212 may include 64 pages. In another example, each of pages 221, 222, 223, and 224 in each of blocks 211 and 212 may include four sectors. In another example, each sector in each of blocks 211 and 212 may include 4096 cells to store 512 bytes of information.

In FIG. 2, memory device 201 may include a non-volatile memory device. In some embodiments, memory device 201 may include a NAND flash memory device where cells 204 may include flash cells arranged in a NAND flash memory arrangement. In other embodiments, memory device 201 may include a memory device such as a NOR flash memory device, a polymer memory device, a ferro-electric random-access memory (FeRAM) device, a phase-change memory (PCM) device, e.g., Ovionics Universal Memory (OUM) device, a nitride read only memory (NROM) device, or a magnetoresistive random access memory (MRAM) device.

One skilled in the art will readily recognize that memory device 201 may include other components, which are omitted from FIG. 2 to focus on the various embodiments described herein.

Scanning for errors in information stored in memory device 201 may be performed in device-based, block-based, block-based random page, time-based scanning, or a combination thereof. For example, in device-based scanning, the entire memory array 202 may be scanned after a number of sectors in memory array 202 are read or after a number of read operations are performed on memory device 201. In block-based scanning, only block 211 or 212 may be scanned after a number of sectors in the block are read or after a number of read operations are performed on that block. In block-based scanning, only block 211 or 212 may be also be scanned after a number of sectors in the block are written or after a number of write operations are performed on that block. In block-based random page scanning, a page in a selected one of blocks 211 and 212 may be randomly scanned based on a read operation of another page within the same selected block. In time-based scanning, memory array 202 may be scanned at after each time interval, for example, at each number of days.

Figure 3:
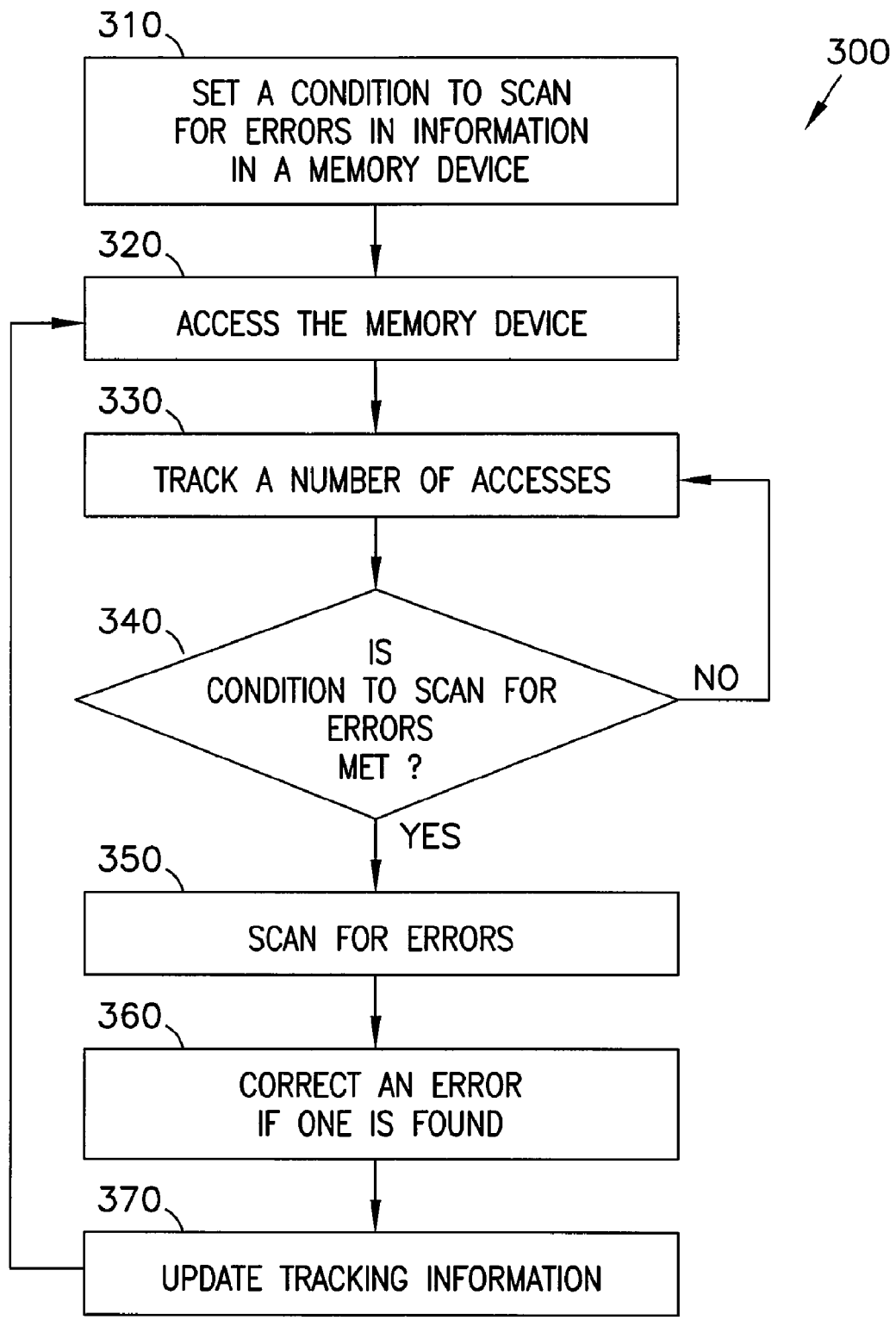
FIG. 3 is a flow diagram of a method of scanning for errors according to an embodiment of the invention.

In some embodiments, the operations and activities in memory device 201, including the scan for errors in information stored in memory device 201, may include an embodiment of the activities in FIG. 3.

FIG. 3 is a flow diagram of a method 300 of scanning for errors according to an embodiment of the invention. Method 300 may be used in a system, such as system 100 of FIG. 1, or in a memory device, such as memory device 201 of FIG. 2. Thus, the memory device in method 300 may include memory device 101 of FIG. 1 or memory device 201 of FIG. 2.

Activity 310 of FIG. 3 may set a condition to scan for errors in information stored in a memory device. A circuit in a controller or a processor, such as memory controller 103 or processor 106 of FIG. 1, or a circuit, such as control circuit 216 of memory device 201 of FIG. 2, may set the condition. Setting the condition may include storing at least one of selected values in a storage unit. A storage unit, such as storage unit 132 of FIG. 1, may store the selected values set by activity 310.

Setting the condition in activity 310 may include storing a first selected value such that scanning for errors may be performed when a number of read operations in the memory device exceeds or is at least equal to the first selected value. For example, when the first selected value is set at M, where M is an integer, scanning for errors may be performed when the number of read operations the memory device exceeds or is at least equal to M.

Setting the condition in activity 310 may also include storing a second selected value such that scanning for errors may be performed when a number of read operations in a block of the memory device exceeds or is at least equal to the second selected value. For example, when the second selected value is set at B, where B is an integer, scanning for errors may be performed when the number of read operations in the block exceeds or is at least equal to B.

Setting the condition in activity 310 may also include storing a third selected value such that scanning for errors may be performed at a random location in a block of the memory device when a number of read operations in a block of the memory device exceeds or is at least equal to the third selected value. For example, when the third selected value is set at R, where R is an integer, scanning for errors may be performed at the random location when the number of read operations in the block exceeds or is at least equal to R.

Setting the condition in activity 310 may also include storing a fourth selected value such that scanning for errors may be performed in a block of the memory device when a number of write operations in that block exceeds or is at least equal to the fourth selected value. For example, when the fourth selected value is set at W, where W is an integer, scanning for errors may be performed on the block when the number of write operations in the block exceeds or is at least equal to W.

Setting the condition in activity 310 may also include storing a fifth selected value such that scanning for errors may be performed at every time interval that is indicated by the fifth value. For example, when the fifth selected value is set at T, which may represent a time interval such as a number of days, scanning for errors may be performed at every time interval indicated by T.

In activity 310, the first, second, third, fourth, and fifth selected values may be stored in any combination. For example, only one of the first, second, third, fourth, and fifth selected values may be stored. Thus, the condition to scan for errors in information in the memory device may depend on only one of the first, second, third, fourth, and fifth selected values stored by activity 310. In another example, at least two of the first, second, third, fourth, and fifth selected values may be stored. Thus, the condition to scan for errors in information in the memory device may depend on at least two of the first, second, third, fourth, and fifth selected values.

Activity 320 may access the memory device. Accessing the memory device may include performing a write operation to store or write information to the memory device, and performing a read operation to read information from the memory device.

Activity 330 may track a number of accesses. The number of accesses may include a number of accesses to and from the memory device. In some embodiments, activity 330 may track the number of accesses by counting the number of accesses. A counter, such as counter 151 of FIG. 1, may count the number of accesses in activity 330. The counter, or a storage unit such as storage unit 132 of FIG. 1, may store the number of accesses after they are counted.

The number of accesses may include a number of read operations in the memory device. The number of read operations may include a total number of read operations performed on sectors of more than one block of the memory device. The number of accesses may also include a number of read operations in a block of the memory device. The number of accesses may also include a number of write operations in a block of the memory device.

Activity 340 determines whether condition to scan for errors is met. In activity 340, the number of accesses in activity 330 may be compared with a corresponding selected value set by activity 310. The result of the comparison may determine whether the condition is met.

For example, the condition in activity 340 is met when a number of read operations in the memory device exceeds or is at least equal to a selected value (e.g., value B described above), which may be stored in a storage device by activity 310.

In another example, the condition in activity 340 is met when a number of read operations in a block of the memory device exceeds or is at least equal to a selected value (e.g., value B described above), which may be stored in a storage device by activity 310.

In another example, the condition in activity 340 is met when a number of read operations in a block of the memory device exceeds or is at least equal to a selected value (e.g., value R described above), which may be stored in a storage device by activity 310.

In another example, the condition in activity 340 is met when a number of write operations in a block of the memory device exceeds or is at least equal to a selected value (e.g., value W described above), which may be stored in a storage device by activity 310.

In another example, the condition in activity 340 is met when an amount of time has passed after the information was stored in the memory device, and the amount of time exceeds or is at least equal to an amount of time indicated by a selected value, which may be set in activity 310.

As shown in FIG. 3, when the condition in activity 340 method 300 is not met (indicated by "NO"), method 300 may repeat activity 330. Method 300 may continue with activity 350 when the condition is met (indicated by "YES").

Activity 350 may scan for errors. Scanning in activity 350 may include scanning only a portion of the memory device or the entire memory device. Scanning in activity 350 may include at least one of device-based scanning, block-based scanning, block-based random location scanning, and time-based scanning.

Activity 350 may perform device-based scanning when the number of read operations in the memory device exceeds or is at least equal to a selected value (e.g., value M described above). In device-based scanning, activity 350 may read cells that have stored information and skip reading cells that have no stored information. The cells having stored information may reside in one or more blocks of the memory device. In some embodiments, in device-based scanning, scanning in activity 350 may read both cells with stored information and cells without stored information.

Activity 350 may perform block-based scanning when the number of read operations in a block exceeds or is at least equal to a selected value (e.g., value B described above). In block-based scanning, activity 350 may read cells in only a selected block when the number of read operations in the selected block exceeds or is at least equal to the second selected value stored by activity 310.

Activity 350 may perform block-based random location scanning when the number of read operations in a block exceeds or is at least equal to a selected value (e.g., value R described above). In block-based random location scanning, activity 350 may read cells at a random location in a block to scan for errors. The rate at which activity 350 may read the cells at a random location may be based on a selected value such the value R. In some embodiments, the address of the random location may be a function of an offset value and an address provided to the memory device during a normal memory read operation (not scanning for errors read operation). For example, if a selected value, such as R, is 12 and the offset value is 16, then after every 12 normal memory read operations are performed to a block, an additional read operation (e.g., the 13th read operation) may be performed to read cells at a random location to scan for errors. In this example, the address for the random location in the additional read operation (13th read operation) may be determined based on the address of the location in the 12th read operation and the offset value (which is 16 in this example). For example, the address of the random location in the 13th read operation may be determined from the address of the location in the 12th read operation plus (or minus) the offset value. The offset value may be selected and stored in a storage unit, such as the storage unit used in activity 310. In block-based random location scanning, the offset value may be obtained by accessing the storage unit where the offset value may be stored.

In some embodiments, the random location may include a location of a page of a block. Thus, in some embodiments, the offset value may be selected based on a number of pages in a block. For example, when a block has 64 pages numbering from 0 to 63, the offset value may be from 1 to 62. In this example, the address of the random page (to be scanned for errors) may be the address of the page (one of the 64 pages) being read in the normal read operation plus (or minus) the offset value such that the address of the random page may be within the block.

Scanning in activity 350 may also perform block-based scanning when the number of write operations in a block exceeds or is at least equal to a selected value (e.g., value W described above), which may be stored by activity 310. For example, activity 350 may read cells at one location in a block to scan for errors after writing information to cells at another location of the same block.

As described in FIG. 2, a block may include multiple pages. The block may be written page by page at different write operations and in a sequential order, for example in a sequential order of a first page, intermediate pages, and a last page. Since the block may be written page by page, the number of operations may correspond to the number of pages that have been written. In FIG. 3, activity 350 may read cells of the pages that have been written after writing information to a new page. For example, if a selected value is 14 (e.g., W=14) and if a number of write operations has been performed on a block is 14 (e.g., 14 pages have been written), then, after writing to the block in the 15th write operation, activity 350 may read cells that are previously written (e.g., cells from the first page to the 14th page) to scan for errors. In some embodiments, using the same example herein, activity 350 may read cells from the entire block (including cells written in the 15th write operation) to scan for errors after the 15th write operation.

In some embodiments, the selected value may be chosen such that activity 350 may reads cells from every page of a block to scan for errors every time after cells from a page of the block is written. For example, the selected value may be set at one (e.g., W=1). In other embodiments, to scan for errors, the selected value may be chosen such that activity 350 may reads cells from pages of a block only after at least one-half of a number of pages of block is written. For example, the selected value may be set at one one-half number of the pages of the block (e.g., W=(½) P, where P is the number of the pages of the block).

Activity 350 may perform time-based scanning at time interval to scan for errors. In time-based scanning, activity 350 may read cells that have stored information to scan for errors. For example, if a selected value is 30 days (e.g., T corresponds to a value to 30 days), then every 30 days, activity 350 may read cells that have stored information to scan for errors.

As described above in activity 350, information may be read from the cells of the memory device to scan for errors based on one or more condition being met. A correction operation may be performed to correct any errors in the information based on the scan that is obtained from activity 350.

In some embodiments, scanning for errors in activity 350 may include reading information from memory cells of the device and determining ECC data (e.g., new check bits) associated with the information when the information is read from the cells. Then, the ECC data (e.g., new check bits) may be compared with the ECC data (e.g., old check bits) associated with the information when the information was written into the memory cells. A mismatch between the two ECC data (e.g., old and new check bits) may indicate an occurrence of errors in the information.

In other embodiments, scanning for errors in activity 350 may include accessing specialized hardware in the memory device to determine if errors in information may occur. For example, scanning for errors in activity 350 may include accessing reference cells of the device to determine if voltage level values representing the information in reference cells remain within a limit. In this example, the errors in information may occur if the voltage level values are outside the limit (e.g., the voltage level values dropping below the limit or exceeding the limit). In some embodiments, the reference cells may be a portion of cells a of memory array such as cells 104 of memory array 102 of FIG. 2. In some embodiments, a controller or a processor, such as memory controller 103 or processor 106 of FIG. 1 (instead of an error correction such as error correction unit 134 of FIG. 1) may access specialized hardware (e.g., reference cells) in the memory device to determine if errors in information occur.

Activity 360 may correct an error if one is found. For example, activity 360 may check the information to determine a bit error quantity (one or more error bits that may occur) when an error in the information exists. Activity 360 may then correct the error when the bit error quantity is equal to or greater than to a selected value. A correction unit, such as error correction unit 134 of FIG. 1, may perform the correction. In some embodiments, the correction unit may correct the error when the bit error quantity is at least one. Thus, in these embodiments, any error bit found may be corrected. In other embodiments, the correction unit may correct the error only when the bit error quantity exceeds some value for each number of bits scanned. The number of bits scanned may be the number of bits in a sector. For example, the correction unit may correct the error only when the bit error quantity exceeds three for each number of bits in a sector that is scanned.

Activity 370 may update tracking information. For example, one or more values that is tracked in activity 330 may be reset to an initial value after a scan for errors in activity 350 is performed. For example, after a block is scanned for errors, the number of read operations performed on that block may be reset to the initial value (e.g., zero) so that another scan for errors may be performed to the block when the number of read operations performed on that block, after reset, is least equal to the selected value (e.g., value B). Other values that are tracked by activity 330 may be reset after a scan for errors based on the other values are performed. After activity 370, method 300 may repeat one or more other activities described above. For example, method 300 may repeat the other activities, described above, starting from activity 320.

The individual activities of method 300 may not have to be performed in the order shown or in any particular order. Some activities may be repeated, and others may occur only once. Various embodiments may have more or fewer activities than those shown in FIG. 3. For example, method 300 may omit one or more of activities 320, 330, and 370 when method 300 performs time-based scanning. In some embodiments, method 300 may include the activities or operations described with reference to FIG. 1 through FIG. 2 above and FIG. 4 and FIG. 6 below.

Figure 4:
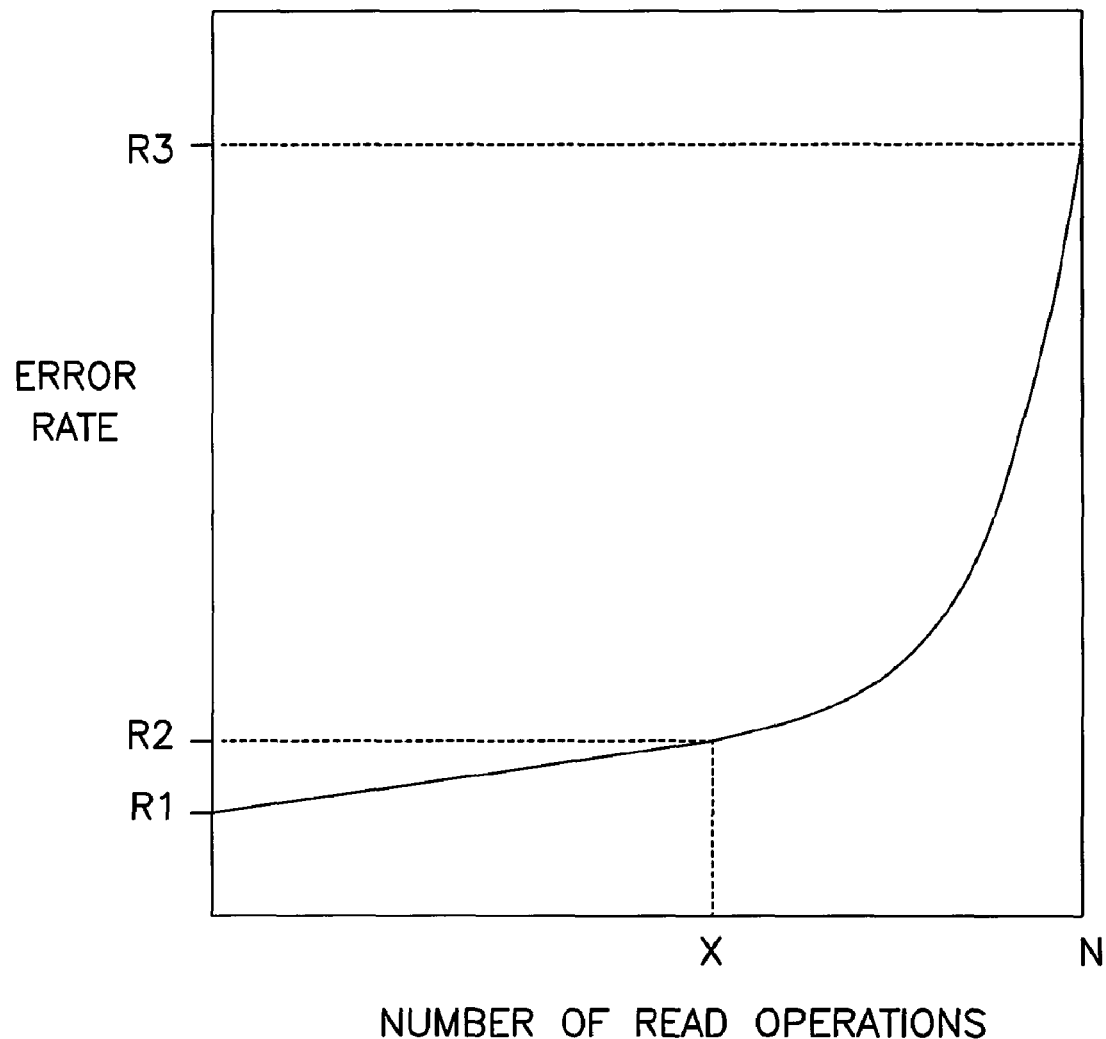
FIG. 4 is a chart showing a relationship between error rate and number of read operations of the memory device of FIG. 2.

FIG. 4 is a chart showing a relationship between error rate and number of read operations of memory device 201 of FIG. 2. In FIG. 4, X and N may represent some particular numbers of read operations performed on memory device 201. R1, R2, and R3 in FIG. 4 may represent error rates in relation to the number of read operations. As shown in FIG. 4, the error rate may increase in a linear fashion from R1 to R2 when the number of read operations is less than or equal to X. When the number of read operations is more than X, the error rate may increase in an exponential fashion from R2 to R3. Thus, in FIG. 4, the error rate increases at a relatively higher rate when the number of read operations is at least X. Therefore, in memory device 201, scanning for errors when the number of the read operations is at least X may be more economical than scanning for errors when the number of the read operations is less than X, because the chance of finding errors may be significantly greater when the number of read operations is X or more.

In some embodiments, a number of read operations such as X in FIG. 4 may be determined during a test. For example, during a test, numerous read operations may be performed on memory device 201, then error rates (e.g., R1, R2, and R3) corresponding to the read operations may be recorded. The number of read operations, such as X in FIG. 4, may be determined at a point where the error rate starts to show a significant change. For example, as shown in FIG. 4, X may be determined at a point corresponding to R2 because the curve connecting R1, R2 and R3 shows a significant change in the slope connecting R2 and R3 relative to the slope between R1 and R2. In some embodiments, the number of read operations X is about 1000. In some embodiments, the number of read operations X is in a range of about 1000 to about 2000. Thus, in some embodiments, scanning for errors in information stored in a memory device, such as memory device 201, may start when the number of read operations (e.g., X) is at least 1000.

FIG. 5 shows a network 500 according to an embodiment of the invention. Network 500 may include systems 561 and 562 communicating with each other via a connection 563. Connection 563 may include a wired or wireless connection. In some embodiments, connection 563 may include an interne connection.

System 561 may include a processor 510, an image sensor device 520, a memory device 525, a memory controller 530, a graphics controller 540, a circuit module 545, an input and output (I/O) controller 550, a display 552, a keyboard 554, a pointing device 556, peripheral device 558, and a bus 560 to transfer information among the components of system 561. System 561 may also include an antenna 570 to transmit and receive information wirelessly. System 561 may also include a circuit board 502 on which some components of system 561 may be located. In some embodiments, the number of components of system 561 may vary. For example, in some embodiments, system 561 may omit one or more of display 552, image sensor device 520, memory device 525, and circuit module 545. System 561 may include an embodiment of system 100 of FIG. 1.

Processor 510 may include a general-purpose processor, e.g., a processor used in a computer. Processor 510 may include an application specific integrated circuit (ASIC), e.g., a processor used in a cellular phone, or a digital camera or camcorder. Processor 510 may include a single core processor or a multiple-core processor. Processor 510 may execute one or more programming commands to process information and produce processed information. The information that is processed by processor 510 may include digital output information provided by other components of system 561, such as by image sensor device 520 or memory device 525.

Image sensor device 520 may include a complementary metal-oxide-semiconductor (CMOS) image sensor having a CMOS pixel array or charge-coupled device (CCD) image sensor having a CCD pixel array.

Memory device 525 may include a volatile memory device, a non-volatile memory device, or a combination of both. For example, memory device 525 may include a dynamic random access memory (DRAM) device, a static random access memory (SRAM) device, a flash memory device such as NAND or NOR flash memory device, or a combination of DRAM, SRAM, and flash memory devices. In some embodiments, memory device 525 may include one or more embodiments of memory device 101 or 201 described above with reference to FIG. 1 through FIG. 4.

Display 552 may include an analog display or a digital display. Display 552 may include a liquid crystal display (LCD), or a plasma display. Display 552 may receive information from other components. For example, display 552 may receive information that is processed by one or more of image sensor device 520, memory device 525, graphics controller 540, and processor 510 to display information including text and images.

Circuit module 545 may include a circuit module of a vehicle. Circuit module 545 may receive information from other components to activate one or more subsystem of the vehicle. For example, circuit module 545 may receive information that is processed by one or more of image sensor device 520, memory device 525, and processor 510, to activate one or more of an air bag system of a vehicle, a vehicle security alarm, and obstacle alert system in a vehicle.

As shown in FIG. 500, system 561 may include a machine-readable medium 571. System 562 may include a machine-readable medium 572. Each of machine-readable media 571 and 572 may include a memory, e.g., removable storage media, and any memory including an electrical, optical, or electromagnetic conductor.

Each of machine-readable media 571 and 572 may contain thereon associated information (e.g., computer or software program instructions and/or data), which when executed, results in a machine (e.g., components of system 561) performing one or more of the activities described herein with respect to the FIG. 1 through FIG. 5.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods including the activities described herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

The illustrations of systems and apparatus herein, such as systems 100, 561, and 562, and memory devices 201, and 525 are intended to provide a general understanding of the structure of various embodiments, and not as a complete description of all the elements and features of apparatus and systems that might make use of the structures described herein.

The novel apparatus, systems, and method of various embodiments may include, be included, or used in electronic circuitry used in high-speed computers, communication and signal processing circuitry, single or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The above description and the drawings illustrate some embodiments of the invention to enable those skilled in the art to practice the embodiments of the invention. Other embodiments may incorporate structural, logical, electrical, process, and other changes. In the drawings, like features or like numerals describe substantially similar features throughout the several views. Examples merely typify possible variations. Portions and features of some embodiments may be included in, or substituted for, those of others. Many other embodiments will be apparent to those of skill in the art upon reading and understanding the above description. Therefore, the scope of various embodiments of the invention is determined by the appended claims, along with the full range of equivalents to which such claims are entitled.

The Abstract is provided to comply with 37 C.F.R. §1.72(b) requiring an abstract that will allow the reader to quickly ascertain the nature and gist of the technical disclosure. The Abstract is submitted with the understanding that it will not be used to interpret or limit the scope or meaning of the claims.

What is claimed is:

1. An apparatus comprising:
a circuit to set at least one condition to scan for errors in information stored in a memory array of a memory device, the condition to scan being based on a number of accesses to cells of the memory device, wherein the number of accesses comprises a number of read operations, and wherein the condition to scan is stored in a storage unit in the memory device, and the storage unit is located outside the memory array; and
a component to scan for errors in the information when the condition is met.

2. The apparatus of claim 1, wherein the condition for scanning is further based on an amount of time passed after the information was stored in the memory device.

3. The apparatus of claim 1, wherein the condition is met when the number of accesses to cells of the memory device is at least equal to a selected value.

4. The apparatus of claim 1, wherein the storage unit is configured to store a selected value, and wherein the condition is met when the number of read operations performed on only a selected portion of the memory device is at least equal to the selected value.

5. An apparatus comprising:
a component to scan for errors in information stored in a memory array of a memory device when a condition for scanning is met, the condition for scanning being based on an amount of time passed after the information was stored in the memory device, wherein the condition to scan is stored in a storage unit in the memory device, and the storage unit is located outside the memory array.

6. The apparatus of claim 5, wherein the storage unit is configured to store a selected value, and wherein the condition is met when the amount of time is at least equal to the selected value.

7. The apparatus of claim 5, wherein the storage unit is configured to store an offset value, and wherein the component is to scan for errors at a location with an address based on the offset value.

8. The apparatus of claim 5, wherein the component comprises a real-time clock to determine a time interval to scan for errors.

9. A method comprising:
scanning for errors in information stored in a memory array of a memory device when a condition for scanning is met, the condition for scanning is being based on a number of accesses to cells of the memory device, wherein the condition to scan is stored in a storage unit in the memory device, and the storage unit is located outside the memory array; and
counting a number of read operations in the memory device to determine whether the condition for scanning is met.

10. The method of claim 9, further comprising:
comparing error correction code (ECC) data associated with the information when the information is read with ECC data associated with the information when the information was written into the cells to determine whether an error occurs.

11. The method of claim 10, further comprising:
correcting at least one error bit in the information when the error occurs.

12. The method of claim 9, wherein the scanning is performed when the number of accesses is at least 1000.

13. A method comprising:
scanning for errors in information stored in a memory array of a memory device when a condition for scanning is met, the condition for scanning being based on an amount of time passed after the information was stored in a storage unit in the memory device, wherein the condition to scan is stored in the memory device, and the storage unit is located outside the memory array.

14. The method of claim 13, wherein the condition for scanning is met when the amount of time is at least one day.

15. The method of claim 13, wherein scanning is performed at a selected time interval.

* * * * *